United States Patent [19]

Küschall

[11] Patent Number: 5,355,977
[45] Date of Patent: Oct. 18, 1994

[54] PARKING BRAKE FOR A WHEELCHAIR

[76] Inventor: Rainer Küschall, Ringstrasse 15, CH 4123 Allschwil, Switzerland

[21] Appl. No.: 121,938

[22] Filed: Sep. 15, 1993

[30] Foreign Application Priority Data

Sep. 16, 1992 [CH] Switzerland .................. 921/92

[51] Int. Cl.$^5$ ................... B60T 1/04; A61G 5/00
[52] U.S. Cl. .................... 188/2 F; 188/265; 188/74
[58] Field of Search ........ 188/2 F, 83, 19, 20, 188/21, 22, 24.18, 265, 29, 74; 280/250.1, 304.1; 74/489; 303/89

[56] References Cited

U.S. PATENT DOCUMENTS

| 4,560,033 | 12/1985 | DeWoody et al. | 188/2 F |
|---|---|---|---|
| 4,570,756 | 2/1986 | Minnebraker et al. | 188/2 F |
| 4,589,525 | 5/1986 | Phipps et al. | 188/74 |
| 4,682,783 | 7/1987 | Kuschall . | |
| 4,691,933 | 9/1987 | Strauss | 188/2 F |
| 4,749,064 | 6/1988 | Jinno et al. | 188/74 |
| 4,852,697 | 8/1989 | Kulik | 188/2 F |
| 4,887,830 | 12/1989 | Fought et al. | 188/2 F |
| 5,197,577 | 3/1933 | Hayek | 188/265 |

FOREIGN PATENT DOCUMENTS

| 0204040 | 12/1986 | European Pat. Off. | 188/2 F |
|---|---|---|---|
| 3812107 | 10/1989 | Fed. Rep. of Germany | 188/2 F |

Primary Examiner—Douglas C. Butler

[57] ABSTRACT

The parking brake can be fitted to the wheelchair frame largely regardless of the nominal position of the brake element, and conversely the position of the brake element can be exactly matched to the position of the rear wheel. A two-piece clamp connects a cylindrical bearer to a part of the wheelchair frame and allows the bearer's rotation and lengthwise displacement relative to the frame. One end of the bearer holds the pivoting brake element and locking lever. One arm of the locking lever acts together with the brake element and has two recesses. When the locking lever is moved to a released position, spring action forces the brake element to engage one of the recesses and to be located beside the rear wheel approximately perpendicular to the wheel's rotational axis. When the locking lever is moved to a braking position, the brake element engages the second recess and is located more or less parallel to the rotational axis of the rear wheel. This ensures that the brake element moves accurately to clearly defined end positions.

5 Claims, 2 Drawing Sheets

PARKING BRAKE FOR A WHEELCHAIR

BACKGROUND OF THE INVENTION

The present disclosure relates to a parking brake for a wheelchair, which has a rod-shaped brake element that acts on one of the rear wheels of the wheelchair, and a locking lever, wherein both the brake element and the locking lever can rotate on a mount attached to part of the wheelchair frame and act together so as to move the brake element from the braking position to the released position and vice versa whenever the locking lever is moved, the brake element being more or less parallel to the axis of the rear wheel in the braking position and approximately perpendicular to it in the released position.

PRIOR ART

Parking brakes are used to block wheelchairs in their position at rest. Parking brakes for wheelchairs known from prior art are activated by a system of rods and levers, in which the rod-shaped brake element is knurled and is parallel to the rotational axis of the corresponding wheel in both the braking and the released position, and when a ventilated brake is used, the position of the rod-shaped brake element is only a short distance from the tyre of the wheel. Because the way the brake is fitted to the wheelchair frame must readily allow the disabled person to reach the locking lever, there is a risk of injury from the brake element when the wheels are propelled by hand. This is why other parking brakes for wheelchairs have been developed in which the brake element pivots so that in the released position it is adjacent to the rear wheel more or less perpendicular to the wheel's rotational axis. This is intended to prevent the wheelchair's user accidentally touching the brake element when he/she is moving the rear wheel.

Such a known type of parking brake fits directly on the wheelchair frame by a clamp, and the screw that secures the clamp is at the same time used to attach the locking lever. The latter has a plate which acts together with the brake element. The plate has an circular arc-shaped slot to guide the brake element as it moves from the braking position to the released position when the locking lever is actuated and the brake element moves from one end of the slot to the other. The slot in the plate thus also acts as a stop at the two end positions of the locking lever. The brake element is made of round steel rod and forms two bends so that it points in three directions perpendicular to one another. One end is held directly by and can rotate in the clamp. In this type of parking brake the locking lever is held in the end positions in the slot solely by gravity or friction, and this leads to inaccuracy in use. When a slot is used as the guide for the brake element, both the slot and the bearing of the brake element must be made with large tolerances; so that jamming and hence rapid wear and tear on the bearing are difficult to avoid. With this type of parking brake the position of the clamp on the frame is determined by the position required by the brake element in relation to the wheelchair's rear wheel, i.e. the freedom of choice is limited and the position varies according to the wheel diameter. Moreover, adjustment of the brake element's position to suit different positions of the wheelchair's rear wheel relative to the frame, for example adjustment axially or of wheel camber is possible only to a very limited extent.

BRIEF SUMMARY OF THE INVENTION

The present invention proposes a parking brake of the type referred to above, but which does not suffer from the handicaps described, ensures clearly defined, accurate guidance of the brake element, has well-defined end positions, and in particular permits positioning of the clamping shackle regardless of the nominal position of the brake element.

The present invention meets these requirements. It provides a cylindrical bearer parallel with the part of the frame to which it is held by a two-piece clamp that allows it to slide lengthwise and rotate. The brake element and the locking lever are attached to and can rotate at one end of the cylindrical bearer. The locking lever has an arm that acts together with the brake element and has two recesses, one of which allows the brake element to engage in the braking position, and the other in the released position. A spring presses the brake element against these recesses.

Compared with prior art the invention described in this disclosure has the following advantages: the position where the parking brake and its clamp can be fitted to the wheelchair frame is largely independent of the nominal position of the brake element on the frame, so that the position of the two-piece clamp can take other aspects into account; the back-and-forth displacement of the cylindrical bearer and rotation of the two-piece clamp allow adjustment of the position of the brake element to the exact position of the rear wheel, and this makes it possible to eliminate any differences that occur; and both the special shape of the locking lever and the spring acting on the brake element ensure that the brake element always moves accurately to clearly defined end positions.

A typical embodiment of the present disclosure is described in greater detail by reference to the drawings attached hereto, as follows:

DESCRIPTION OF THE PREFERRED EMBODIMENTS

Figure 1:
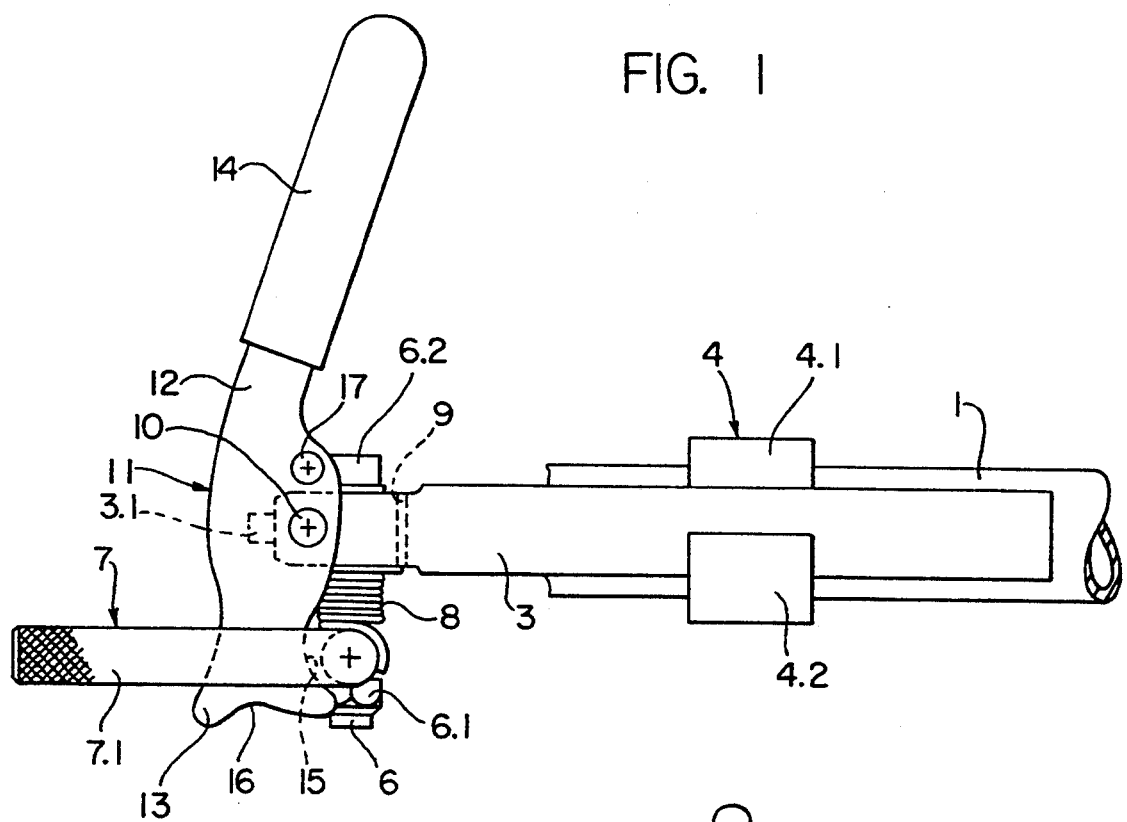
FIG. 1 is a side view of an embodiment of the parking brake described in the present disclosure, in the released position.
Figure 2:
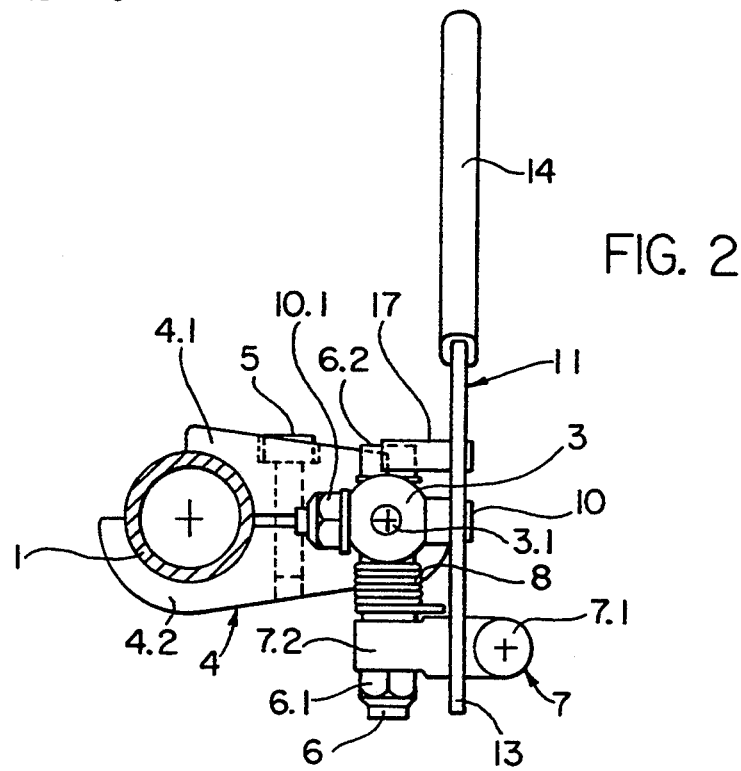
FIG. 2 is a front view of the parking brake in accordance with FIG. 1.
Figure 3:
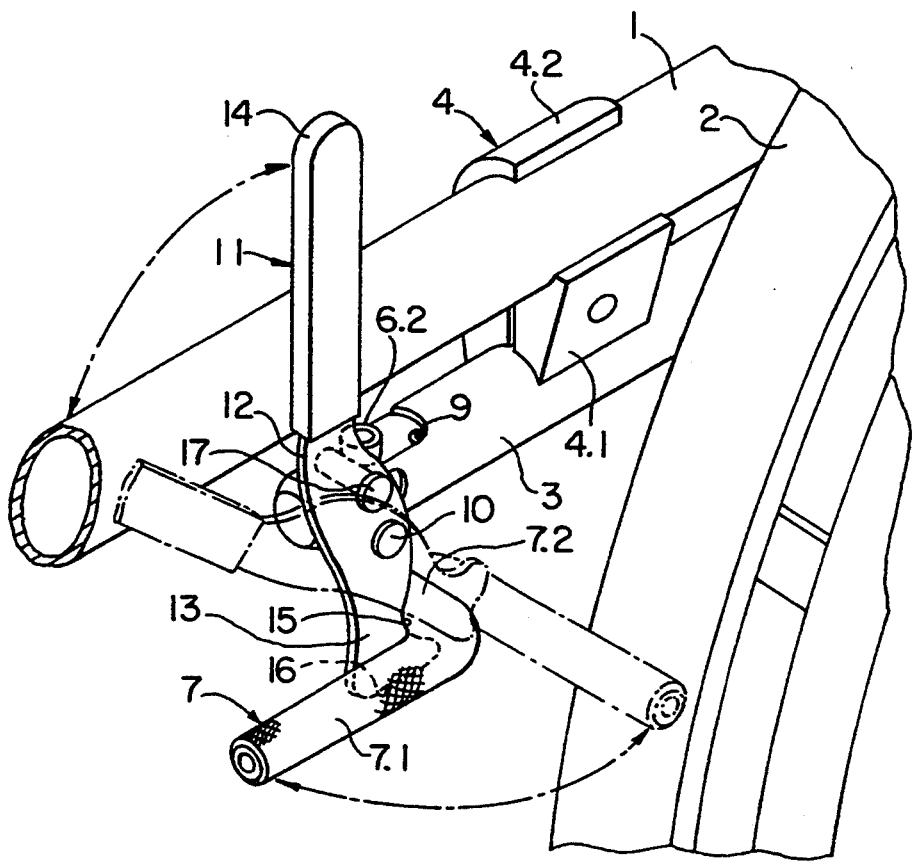
FIG. 3 is a perspective view of the parking brake in a position on the wheelchair frame different from the position in accordance with FIG. 1.

FIGS. 1, 2, and 3 show a tubular section of a wheelchair frame 1 and next to the frame a rear wheel 2 (FIG. 3) that rotates about its rotational axis at right angles to the frame. A two-piece clamp 4 connects the cylindrical bearer 3 parallel to the section of the frame 1. The two-piece clamp 4 has an upper jaw 4.1 and a lower jaw 4.2 screwed together by a clamping screw 5, for which purpose one of the jaws has a through-hole and the other a tapped hole. The cylindrical bearer 3 is several times longer than the width of the two-piece clamp 4. At one end of the cylindrical bearer 3 a bearing bolt 6, for example a screw, is fitted perpendicular thereto and can rotate in position. A nut 6.1 secured in position to prevent loosening attaches a rodshaped brake element 7 to the bearing bolt 6 and is bent at a right angle thereto. One leg 7.1 of the brake element 7 is used to brake the wheel 2 and has a knurled surface. The other leg 7.2 of the brake element 7, bent at a right angle to the former and attached to the bearing bolt 6, is embraced by the bent lower end of a coil spring 8 held between the bearer 3 and the brake element 7 on the bearing bolt 6. The other, upper end of the coil spring 8 is held in a hole 9 drilled in the bearer 3.

Held horizontally in the bearer 3 immediately next to the vertical bearing bolt 6 there is another bearing bolt 10 which can rotate in the bearer 3. This other bearing bolt 10 has a screw thread at one end, with a nut 10.1 fitted thereto and secured against slackening. The other end of the bearing bolt 10 is permanently attached to a locking lever 11, for example by brazing or hardsoldering. For the user's comfort the upwardpointing arm 12 of the locking lever 11 may have a nonslip coating or cover 14 of plastic or other synthetic material. The other arm 13 which acts together with the brake element 7 has two recesses 15, 16; the first recess 15 receives the brake element 7 in the released position, the other 16 in the braking position (dot-dashed line in FIG. 3). The coil spring 8 presses the brake element 7 against the recesses 15, 16 and in the direction opposed to the position of release. In the released position a stop pin 17 fitted to the upward-pointing arm 12 of the locking lever 11 stops the brake element 7 against a head 6.2 of the vertical bearing bolt 6. A stud 3.1 limits the downward movement of the stop pin 17 and thus of the locking lever 11. When the brake element presses against the wheel 2 in the normal braking position, the stop pin 17 stops short of the stud 3.1, but can reach it only when the wheelchair is not in use and the wheel is removed.

To fit the parking brake to the wheelchair frame, the two-piece clamp 4 is first placed in any desired and suitable position on the frame 1. By axial displacement of the bearer 3 and rotation of the two-piece clamp 4 the brake element 7 can be correctly positioned and adjusted as necessary to the wheelchair's rear wheel 2. When the locking lever 11 is moved to release the wheel, the brake element 7 moves into a position next to the rear wheel 2, more or less perpendicular to the wheel's axis, and due to the action of the coil spring 8 engages in the first recess 15 of the locking lever 11 (continuous lines in FIG. 3). When the locking lever 11 is moved to the braking position, the brake element 7 swings more or less parallel to the rear wheel's rotational axis, presses against the wheel 2, and engages in the second recess 16 of the locking lever 11 (dot-dashed lines in FIG. 3).

A modified design of the locking lever 11 and the bearer 3, would, for example, permit the use of a tension spring with suitable catching action instead of a coil spring 8.

The space available on a wheelchair's tubular frame is often very limited, because the material and fixings for the seat and back, and attachments for other components, such as arm rests, struts, etc take up much of the frame's total length. Because of this, the means of moving the clamp 4 along the frame 1 regardless of the brake element's nominal position, which the invention described in the present disclosure offers, is a considerable advantage. Further, by suitable positioning and rotation of the clamp along the length of the tubular frame and by length adjustment and rotation of the bearer 3, as indicated by the different positions of the frame 1 in FIGS. 1 and 3, the position of the brake element can be adjusted relative to the wheel 2 to suit not only the wheel diameter but also the wheel position and camber. Moreover, the brake as described in the present disclosure can be fitted on the left or right-hand side of the frame, as preferred or required.

Figure 4:
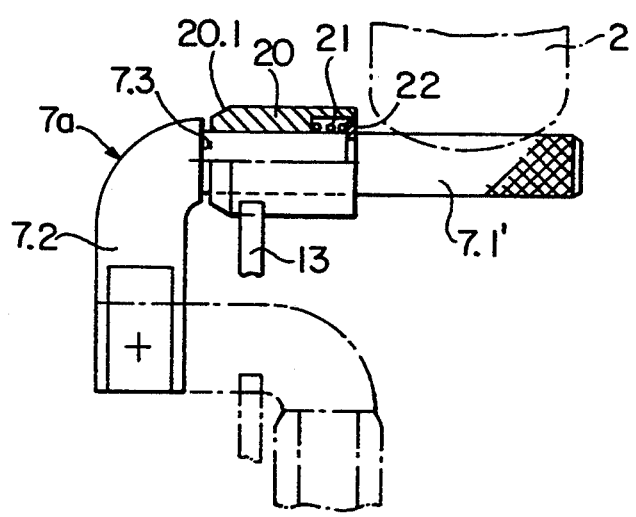
FIG. 4 is a view from above of another embodiment of the brake element.

FIG. 4 shows a different embodiment of the brake element 7a, in the braking position; the released position is shown dot-dashed. The leg 7.1' of brake element 7a which acts against the wheel 2 is made slightly thinner and at the point of transition to the other leg 7.2 it has a rebated face 7.3. On a smooth portion of this leg adjacent to the rebated face 7.3 a sleeve 20 is fitted, shown in partsection and in partelevation, which can slide axially and rotate. A compression spring 21 secured by a retaining ring 22 fits inside a recess in the inside circumference of the sleeve 20 and is designed to hold the sleeve against the rebated face 7.3 (see released position, shown dot-dashed). At its end against the rebated face the sleeve 20 is bevelled 20.1.

When the arm 13 of the locking lever 11 pivots the brake element 7a from the released to the braking position, the arm 13 travels up on the sleeve 20 which can move slightly clear of the rebated face 7.3, and this permits it to slide more easily sideways. When the leg 7.1' is near the end of the pivoting movement, it comes into contact with the wheel 2 and meets with resistance, the arm 13 is already on the cylindrical outer surface of the sleeve 20. As a result, the brake element securely engages between the wheel 2 and arm 13. Because the sleeve 20 can rotate, the arm 13 comes into contact with different parts of its surface when the brake is applied repeatedly. This sleeve thus facilitates use of the brake, reduces wear and tear of the brake element, and prevents scarring.

I claim:

1. Parking brake for a wheelchair defined by a frame having a rear wheel rotatable about a rotational axis at right angles to a section of the frame, said parking brake having a rod-shaped brake element which acts on the rear wheel and a locking lever each of which brake element and locking lever rotates and is fitted to a mount secured to the section of the wheelchair frame, the brake element and the locking lever acting together so that when the locking lever is actuated the brake element is moved from a braking position to a released position and from a released position to a braking position, and the brake element in the braking position being substantially parallel with the rotational axis of the rear wheel and approximately perpendicular thereto in the released position, wherein the improvement comprises a cylindrical bearer and a two-piece clamp forming the mount; the cylindrical bearer being parallel to the portion of the frame to which the bearer is attached, by means of the two piece clamp to allow the bearer to slide lengthwise and to rotate relative to the portion of frame; and the brake element and locking lever being attached to one end of the bearer; and one arm of the locking lever which acts together with the brake element having two recesses, against which a spring presses the brake element; and the brake element in the braking position engaging one of the recesses and in the released position engaging the other of the recesses.

2. Parking brake in accordance with claim 1, wherein the spring is a coil spring held on a bolt that holds the brake element between the bearer and the brake element, and where one end of the coil spring grips the brake element and the bearer supports its other end.

3. Parking brake in accordance with claim 1, wherein the length of the cylindrical bearer is a multiple of the width of the two-piece clamp.

4. Parking brake in accordance with claim 1, wherein one leg of the brake element which acts on the wheel has a sleeve the rotates about it, and the arm of the locking lever is in contact with the circumference of the sleeve when the brake is in the braking position.

5. Parking brake in accordance with claim 4, wherein the sleeve on the aforesaid leg has a limited amount of axial movement and contains a spring that presses it against an axial stop surface.

* * * * *